(12) United States Patent
Zausner et al.

(10) Patent No.: US 8,210,814 B2
(45) Date of Patent: Jul. 3, 2012

(54) CROSSFLOW TURBINE AIRFOIL

(75) Inventors: Jack Raul Zausner, Evanston, IL (US); David James Walker, Burnt Hills, NY (US); Robert Francis Manning, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 838 days.

(21) Appl. No.: 12/141,238

(22) Filed: Jun. 18, 2008

(65) Prior Publication Data

US 2009/0317234 A1 Dec. 24, 2009

(51) Int. Cl.
*F01D 5/18* (2006.01)

(52) U.S. Cl. ........................................ 416/97 R

(58) Field of Classification Search ............... 416/95, 416/96 R, 97 R, 96 A
See application file for complete search history.

(56) References Cited

U.S. PATENT DOCUMENTS

| | | | |
|---|---|---|---|
| 3,533,711 A | 10/1970 | Kercher | |
| 4,514,144 A | 4/1985 | Lee | |
| 4,601,638 A | 7/1986 | Hill et al. | |
| 4,775,296 A | 10/1988 | Schwarzmann et al. | |
| 5,246,340 A | 9/1993 | Winstanley et al. | |
| 5,246,341 A | 9/1993 | Hall et al. | |
| 5,340,278 A * | 8/1994 | Magowan | 416/96 R |
| 5,356,265 A | 10/1994 | Kercher | |
| 5,462,405 A | 10/1995 | Hoff et al. | |
| 5,498,133 A * | 3/1996 | Lee | 416/97 R |
| 5,667,359 A | 9/1997 | Huber et al. | |
| 5,700,132 A | 12/1997 | Lampes et al. | |
| 5,797,726 A | 8/1998 | Lee | |
| 6,174,134 B1 * | 1/2001 | Lee et al. | 416/97 R |
| 6,331,098 B1 * | 12/2001 | Lee | 416/97 R |
| 6,705,836 B2 * | 3/2004 | Bourriaud et al. | 416/97 R |
| 7,097,426 B2 | 8/2006 | Lee et al. | |
| 2008/0163604 A1 * | 7/2008 | Spangler | 60/39.83 |
| 2009/0324425 A1 * | 12/2009 | Hudson | 416/97 R |

FOREIGN PATENT DOCUMENTS

| | | |
|---|---|---|
| EP | 1630352 A1 | 3/2006 |
| GB | 1381481 | 1/1975 |
| GB | 2358226 A | 7/2001 |
| GB | 2395232 A | 5/2004 |
| JP | 59018204 A | 1/1984 |

OTHER PUBLICATIONS

U.S. Appl. No. 11/643,239, filed Dec. 21, 2006, Manning et al.
U.S. Appl. No. 11/643,415, filed Dec. 21, 2006, Manning et al.
Thole et al, "Effect of a Crossflow at the Entrance to a Film-Cooled Hole," Jounal of Fluids Engineering, vol. 119, Sep. 1997, pp. 533-540.
Fu et al, "Rotational Buoyancy Effects on Heat Transfer in Five Different Aspect-Ratio Rectangular Channels With Smooth Walls and 45 Degree Ribbed Walls," Jounal of Heat Transfer, vol. 128, Nov. 2006, pp. 1130-1141.

* cited by examiner

*Primary Examiner* — Matthew W Such
(74) *Attorney, Agent, or Firm* — David J. Clement; Trego, Hines & Ladenheim, PLLC

(57) ABSTRACT

A turbine airfoil includes pressure and suction sidewalls extending axially in chord between opposite leading and trailing edges. The sidewalls are spaced transversely apart to define flow channels extending longitudinally and separated chordally by partitions bridging the sidewalls. A perforate partition includes a row of crossover holes extending obliquely therethrough.

22 Claims, 3 Drawing Sheets

CROSSFLOW TURBINE AIRFOIL

BACKGROUND OF THE INVENTION

The present invention relates generally to gas turbine engines, and, more specifically, to turbine airfoil cooling therein.

In a gas turbine engine, air is pressurized in a compressor and mixed with fuel in a combustor for generating hot combustion gases. Energy is extracted from the gases in turbine stages which power the compressor and perform work by powering a fan in a typical turbofan aircraft engine application.

Turbine efficiency is maximized by maximizing inlet temperature of the combustion gases thereto, but the various turbine components must be suitably cooled for promoting long useful life.

Typical turbine components include stator vanes in the turbine nozzles which channel the combustion gases to a corresponding row of turbine rotor blade extending radially outwardly from a supporting rotor disk.

The stator vanes and rotor blades have typical airfoil configurations specifically configured for maximizing energy extraction from the hot combustion gases. The airfoils are typically hollow and include internal cooling circuits through which pressurized air bled from the compressor is used as a coolant for internally cooling the airfoils during operation.

The spent cooling air is typically discharged through various rows of film cooling holes which extend through the sidewalls of the airfoil for creating thin films of cooling air over the outer surface of the airfoils to provide thermal insulation.

Any air bled from the compressor which is not used in the combustion cycle decreases the overall efficiency of the engine and therefore is typically minimized. However, the stator vanes and rotor blades have complex 3D airfoil configurations starting at the leading edges thereof and increasing in thickness to a maximum width hump region behind the leading edge, with the airfoil then tapering to a narrow and thin trailing edge.

The aerodynamic performance of the airfoils effects corresponding distributions of velocity, pressure, and heat over the generally concave pressure sides and the generally convex suction sides axially between the opposite leading and trailing edges and radially between the radially inner root and outer tip.

The internal cooling circuits of the airfoils are specifically configured to match the external flow environment and tailor use of the limited coolant bled from the compressor.

The prior art is replete with numerous patents dating back over decades which disclose various configurations for cooling the different parts of turbine airfoils with corresponding benefits, as well as disadvantages.

Adding to the complexity of modern turbine airfoil cooling design is the size and manufacture of these components. Large engines have large turbine airfoils and require correspondingly large coolant flow for effective cooling.

Small engines have correspondingly small turbine airfoils which nevertheless require suitable cooling since the combustion gas temperature is as high as possible for maximizing engine efficiency irrespective of engine size.

One significant problem in manufacturing small turbine airfoils is the ability to cast small airfoils with correspondingly small cooling features.

The modern turbine airfoil is typically cast from a nickel based superalloy metal having enhanced strength at high operating temperature. Superalloy airfoils are typically made by casting, which requires ceramic cores that define the small internal cooling features of the airfoil.

However, small ceramic cores are particularly brittle and subject to damage, and therefore increased waste during manufacture. And, cooling features incorporated into the cores have minimal practical sizes which may nevertheless be excessive for the small engine environment.

More specifically, a typical turbine airfoil may include internal impingement holes in corresponding partitions through which the coolant is ejected in small jets for internally impingement cooling various portions of the airfoil.

Correspondingly, the turbine airfoil typically also includes various rows of film cooling holes through the sidewalls thereof that discharge the spent internal cooling air to create the external air thermal insulation.

Whereas the external film cooling holes may be readily formed after airfoil casting using conventional drilling techniques, the internal impingement holes must be formed by casting since internal access is unavailable for drilling.

The significance of these differences is that drilled film cooling holes may be made substantially smaller in diameter than internal cast impingement holes.

The typical film cooling hole is cylindrical in cross section and may have a diameter of about 12-18 mils (0.3-0.46 mm). Such small holes can readily be drilled, but are not typically castable.

Typical internal impingement holes also have cylindrical cross sections and may range in diameter from about 24-90 mils (0.6-2.2 mm) as a function of turbine airfoil size from small to large.

However, the minimum impingement hole size is typically limited by the smallest practical casting size, yet that minimum casting size results in a relatively large impingement hole in small turbine airfoils.

Accordingly, excess coolant will be channeled through even the smallest castable impingement hole in a small turbine airfoil and undesirably reduce the overall efficiency of the engine.

Accordingly, it is desired to provide a turbine airfoil having improved cooling features, and in particular useful for small turbine airfoils.

BRIEF DESCRIPTION OF THE INVENTION

A turbine airfoil includes pressure and suction sidewalls extending axially in chord between opposite leading and trailing edges. The sidewalls are spaced transversely apart to define flow channels extending longitudinally and separated chordally by partitions bridging the sidewalls. A perforate partition includes a row of crossover holes extending obliquely therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
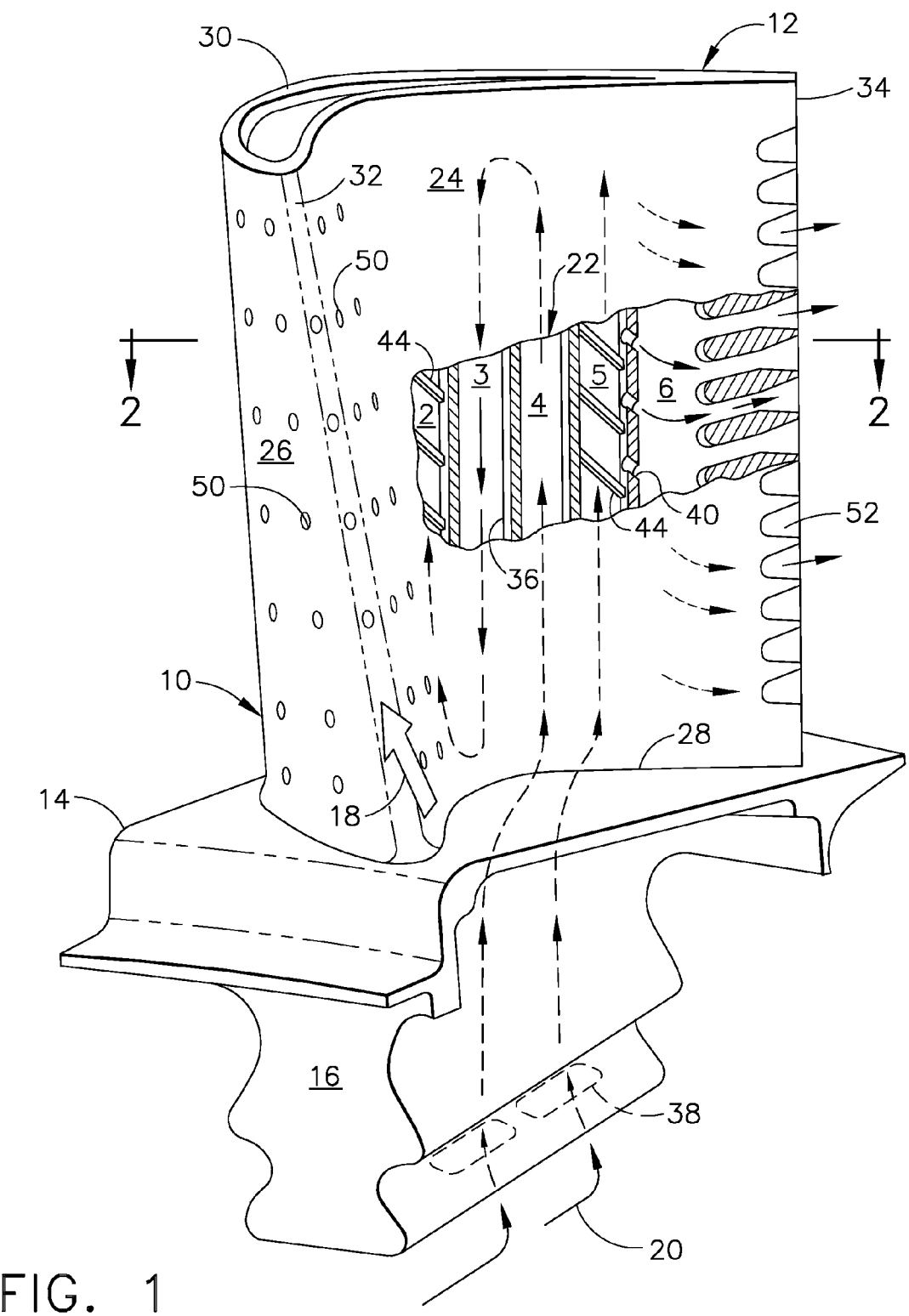
FIG. 1 is a partly sectional isometric view of an exemplary gas turbine engine turbine rotor blade having an internal cooling circuit.

Illustrated in FIG. 1 is an exemplary embodiment of a turbine rotor blade 10 for use in a gas turbine engine. The blade 10 includes an airfoil 12 extending integrally outwardly from an inner platform 14, which in turn is integrally formed with a conventional dovetail 16 configured for mounting the blade to the perimeter of a supporting rotor disk (not shown) in the engine.

The turbine blade 10 illustrated in FIG. 1 is one of a full row thereof supported to the disk which receive hot combustion gases 18 during operation.

The typical gas turbine engine includes in serial flow communication a compressor, combustor, and turbine stages (not shown) which power the compressor during operation. A low pressure turbine typically follows a high pressure turbine and drives an upstream fan in the typical turbofan aircraft engine application (not shown).

Air 20 is pressurized in the compressor during operation and mixed with fuel in the combustor for generating the hot combustion gases 18 which are discharged through the turbine stator nozzle and directed between the turbine rotor blades 10 which extract energy therefrom for turning the supporting disk and powering the compressor rotor.

A portion of the pressurized compressor discharge air 20 is suitably channeled through the blade dovetail 16 into an internal cooling circuit 22 of the blade to limit the temperature thereof during operation within acceptable values for ensuring long useful life of the blade. The cooling circuit 22 may have any conventional configuration in accordance with the specific engine design for either the turbine blade illustrated, or correspondingly in turbine stator vanes having cooled airfoils.

The cooling circuit is specifically modified as described hereinbelow for improving the cooling performance of the limited pressurized air coolant 20 provided thereto during operation. For a given quantity of coolant 20, improved cooling of the blade may be effected, or due to the improved cooling of the blade, the quantity of the coolant may be reduced.

Figure 2:
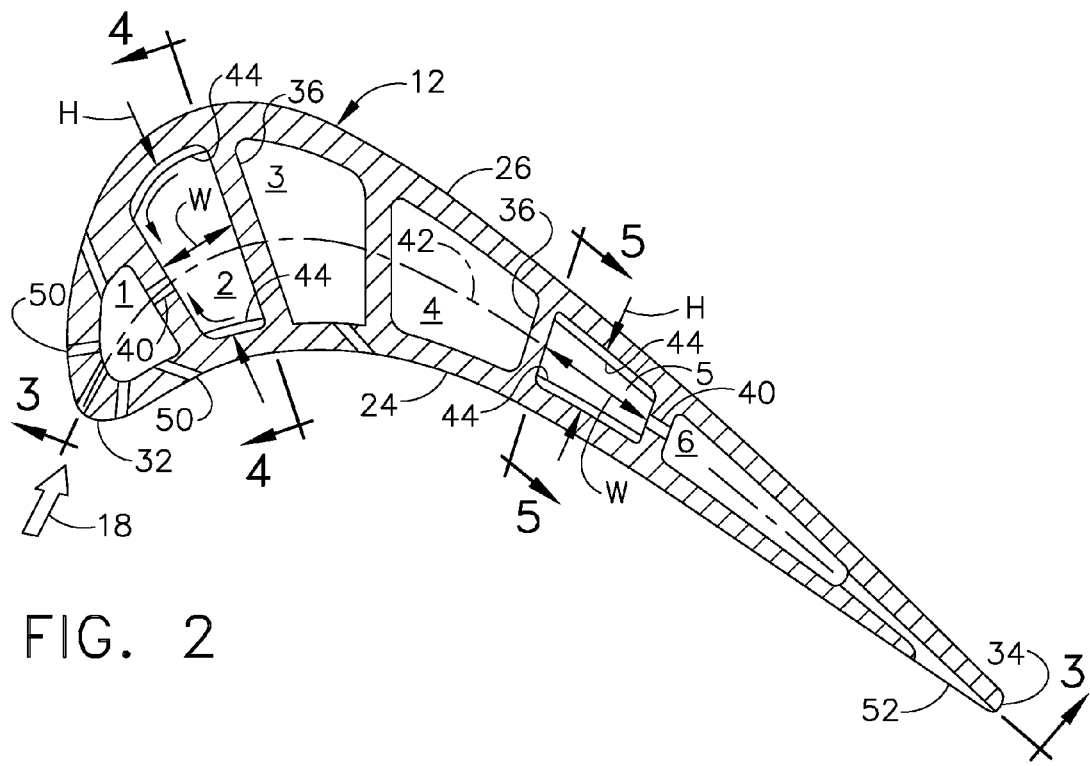
FIG. 2 is a radial or transverse sectional view through the airfoil illustrated in FIG. 1 and taken along line 2-2.

The turbine airfoil 12 is initially illustrated in longitudinal elevation in FIG. 1 and in radial or transverse cross section in FIG. 2 and includes transversely or circumferentially opposite pressure and suction sidewalls 24,26 extending longitudinally or radially in span from a radially inner root 28 at the platform 14 to a radially outer tip 30 at the opposite longitudinal end thereof.

The two sidewalls 24,26 also extend axially in chord between opposite leading and trailing edges 32,34. The pressure sidewall 24 is generally concave in profile from root to tip and between the leading and trailing edges; whereas the suction sidewall 26 is generally convex therebetween.

The two sidewalls are spaced transversely or circumferentially apart between the leading and trailing edges to define the internal cooling circuit 22 through which the pressurized coolant 20 is channeled from the engine's compressor during operation.

More specifically, the two sidewalls 24,26 are spaced apart from each other and locally bridged by corresponding longitudinal walls or partitions 36 which are spaced apart chordally to define corresponding longitudinal or radial flow channels 1-6 of the cooling circuit. In the exemplary embodiment illustrated in FIG. 2, five partitions 36 are spaced axially apart between the leading and trailing edges to define six corresponding longitudinal main flow channels 1-6.

Figure 3:
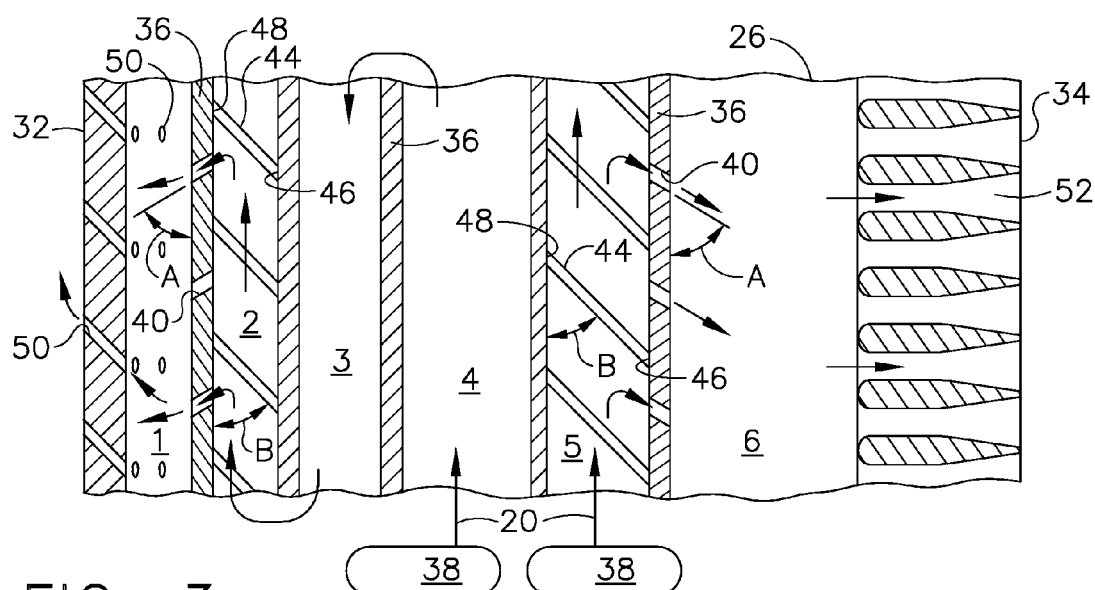
FIG. 3 is a longitudinal or elevational view through a portion of the airfoil illustrated in FIG. 2 and taken along the camber line 3-3.

The cooling circuit 22 and its several flow channels 1-6 may have any conventional configuration, and in the exemplary embodiment illustrated in FIGS. 1-3 includes a dedicated trailing edge circuit in which the fifth flow channel 5 is an inlet channel having a dedicated aperture inlet 38 at the base of the dovetail 16 which receives the pressurized coolant 20.

The fourth flow channel 4 preceding the fifth channel has another dedicated inlet 38 at the base of the dovetail and forms the first leg of a three pass serpentine circuit having a flow bend atop the third and fourth channels for reversing flow direction, and another flow bend at the bottom of the second and third channels for again reversing direction of the flow.

Of particular interest are the second channel 2 and the fifth channel 5 which channel the pressurized coolant 20 radially outwardly in the turbine airfoil, and are specifically configured for correspondingly impingement cooling the leading edge 32 at the first channel 1 and the trailing edge 34 at the sixth channel 6.

More specifically, both the first and the fifth partitions 36 are perforate with each having a single longitudinal row of impingement or crossover holes 40 extending longitudinally or radially obliquely through the corresponding partitions in contradistinction with the typical normal or perpendicular orientation of conventional impingement holes.

Each crossover hole 40 is inclined longitudinally through the perforate partition 36 at an acute inclination angle A which may be preferentially selected relative to the main direction of coolant flow in the corresponding inlet flow channels 2,5.

The crossover holes 40 in each longitudinal row are preferably similarly inclined in unison in the same inclination direction, and preferably at the same magnitude of inclination, although the inclination angles may be varied for maximizing performance advantages depending upon the specific design of the airfoil and its operating environment in a rotating turbine rotor blade, or in a stationary nozzle vane.

As shown in FIG. 2, the radial airfoil section has a middle camber line 42 which bisects the airfoil between the leading and trailing edges 32,34 and corresponds generally with the respective curvatures of the concave pressure sidewall 24 and the convex suction sidewall 26. The crossover holes 40 are preferably arranged in single rows in the corresponding perforate partition 36 midway between the opposite sidewalls 24,26 and extend generally along the camber line 42 or locally parallel therewith.

Although there are six flow channels 1-6 illustrated in the exemplary embodiment in FIG. 2, the crossover holes 40 are typically provided in the first partition 36 directly behind the airfoil leading edge for impingement cooling thereof, and may also be provided in the last partition 36 for similarly impingement cooling the trailing edge region of the airfoil.

The intermediate partitions are typically imperforate, and in the exemplary embodiment illustrated define the multiple passes of the intermediate three-pass serpentine cooling circuit.

As indicated above in the Background section, the internal crossover holes 40 must be formed during the original casting of the entire turbine blade 10, and therefore are defined by corresponding portions of the ceramic core (not shown) used to define the internal void features of the cooling circuit.

Furthermore, those crossover holes 40 are therefore limited in their minimum size due to the minimum size allowed by conventional casting processes. For example, that minimum casting size may be about 24 mils (0.61 mm) for a tubular hole which may be unnecessarily large for certain airfoil designs, and especially for small turbine airfoils typically found in minimum size gas turbine engines. And for small turbine airfoils, the crossover holes 40 may also have oblong or race-track cross-sections of about 20 by 28 mils (0.51 by 0.71 mm) for minimum casting size.

Accordingly, by preferentially inclining the crossover holes 40 away from the normal or perpendicular direction relative to the corresponding perforate partitions 36, a significant pressure drop may be introduced at the otherwise relatively large cast crossover holes 40 for correspondingly reducing the flowrate of the coolant 20 channeled therethrough during operation.

As shown in FIGS. 2 and 3, the second and fifth flow channels 2,5 define corresponding inlet channels on one side of the respective perforate partitions 36, with the first and sixth flow channels 1,6 defining corresponding outlet channels on opposite sides thereof.

For the leading edge circuit, the coolant 20 is channeled longitudinally through the inlet channel 2 and then axially diverted through the crossover holes 40 into the outlet channel 1 toward the leading edge.

Similarly for the trailing edge circuit, the coolant 20 is initially channeled longitudinal through the inlet channel 5 and then diverted aft through the crossover holes 40 into the outlet channel 6 toward the trailing edge 34.

The corresponding inlet channels 2,5 have corresponding inlets, which for the exemplary configuration illustrated in FIGS. 1-3 includes corresponding inlets at the radially inner ends of the flow channels near the airfoil root for example.

FIGS. 1 and 3 illustrate the two dedicated inlets 38 at the base of the dovetail 16 which introduce the coolant to the root of the airfoil. In the trailing edge circuit, the coolant 20 flows radially outwardly through the fifth channel 5. For the leading edge circuit, the coolant 20 is initially carried through the three pass serpentine circuit 4-3-2, with the coolant again flowing radially outwardly through the last serpentine channel 2 which defines the inlet channel for the corresponding crossover holes 40.

In both embodiments illustrated in FIG. 3, the corresponding crossover holes 40 are inclined longitudinally through the perforate partitions 36 counter to the longitudinal inlet channels 2,5 for preferentially reversing direction of the coolant flow therethrough.

Since the main coolant flow through the inlet channels 2,5 is initially radially outwardly in FIG. 3, by inclining the crossover holes 40 radially inwardly into the respective outlet channels 1,6, the main coolant flow is caused to turn sharply and reverse the radially outward direction to a radially inward direction and thereby generate significant pressure losses.

Pressure losses are typically undesirable in efficient gas turbine engine design, but here with the relatively large crossover holes 40, the intentional introduction of additional pressure losses due to the reverse or counter-inclination of the holes 40 may be used to advantage for reducing the excess flowrate of the pressurized coolant as it is channeled through the crossover holes 40.

For the exemplary turbine rotor blade embodiment illustrated in FIGS. 1-3, the sidewalls 24,26 extend longitudinally in span from the root 28 to the tip 30. The crossover holes 40 are therefore inclined longitudinally inwardly from the corresponding inlet channels 2,5 to the corresponding outlet channels 1,6. The corresponding inlet aperture for each crossover hole 40 is therefore located at a higher elevation and span than the corresponding outlet aperture for the crossover holes 40.

For the leading edge circuit illustrated in FIGS. 2 and 3, the outlet channel 1 is disposed directly behind the leading edge 32, and the crossover holes 40 are inclined downward toward the leading edge 32 for impingement cooling the backside thereof with the coolant received from the inlet channel 2.

For the trailing edge cooling circuit illustrated in FIGS. 2 and 3, the outlet channel 6 is disposed directly in front of the trailing edge 34, and the crossover holes 40 are inclined downward toward the trailing edge 34 for impingement cooling the internal front side thereof.

In both embodiments illustrated in FIGS. 2 and 3, the counter-inclination angle A is an acute angle suitably less than 90 degrees for maximizing the introduction of pressure loss. For example, the inclination angle A may fall within the range of 30-80 degrees, and may be optimized based on specific airfoil design.

Further improvements in cooling efficiency may be obtained by introducing cooperating banks of turbulators 44 lining either or both pressure and suction sidewalls 24,26 inside the corresponding inlet channels 2,5 for cooperating with the corresponding crossover holes 40.

The turbulators 44 may have any conventional configuration and are typically elongate rectangular ribs integrally formed with the internal surfaces of the sidewalls, and project only slightly therefrom without fully bridging the flow channels. The turbulators 44 themselves have an acute inclination angle B which is preferably 45 degrees in the exemplary embodiment illustrated, but may be varied as desired for optimizing individual and collective performance thereof with the crossover holes.

As initially shown in FIG. 3, the predominant direction of the main coolant flow is radially outwardly through the two inlet channels 2,5. By introducing the corresponding rows of turbulators 44 inside both sidewalls, the turbulators locally trip the main flow and create corresponding secondary flows shown in FIGS. 4 and 5 which affect heat transfer and cooling performance.

By specifically introducing the turbulators 44 with preferred longitudinal inclination angles and direction relative to the corresponding crossover holes 40, the secondary flow introduced by the turbulators may be used for channeling locally cool portions of the main coolant 20 to the corresponding crossover holes 40.

As initially shown in FIG. 2, each of the flow channels 1-6 has a corresponding transverse profile controlled by its relative location in the airfoil between the leading and training edges. Each flow channel has a corresponding aspect ratio AR which is the ratio of the local width W of the channel in the axial or chordal direction over the circumferential or transverse height H between the opposite sidewalls 24,26.

The various flow channels range in aspect ratio and profile from transversely narrow in the maximum width hump region of the airfoil behind the leading edge to slender and wide channels in the narrow trailing edge region tapering aft from the hump region.

For example, the second flow channel 2 has an aspect ratio less than unity 1:1 and is generally rectangular with a nominal or average aspect ratio of about 1:3.

In contrast, the fifth flow channel 5 has an aspect ratio greater than unity 1:1, and is also generally rectangular with an average or nominal aspect ratio of about 4:1.

Since the second channel 2 is relatively tall in height H in the hump region of the airfoil, the turbulators 44 on the opposite sidewalls 24,26 are spaced substantially apart from each other relative to the narrow width W of the flow channel.

In contrast, the turbulators 44 on the opposite sidewalls bounding the fifth channel 5 are relatively closely spaced together due to the short height H of the flow channel in the thin trailing edge region of the airfoil.

Correspondingly, the crossover holes 40 in the perforate partition of the second channel 2 are located along the middle camber line of the airfoil which bisects the tall flow channel 2. And, in the short fifth channel 5, the crossover holes 40 are similarly located along the bisecting camber line, but in the aft perforate partition 36 which is relatively short and places the crossover holes closely adjacent to the turbulators.

As shown in FIG. 3, the turbulators 44 in the forward inlet channel 2 having the low aspect ratio have a first inclination direction or orientation terminating at the forward perforate partition 36 which feeds the coolant to the leading edge outlet channel 1.

In contrast, the corresponding turbulators 44 in the trailing edge inlet channel 5 have an opposite second inclination direction starting at the aft perforate partition 36 for the high aspect ratio flow channel 5 which feeds the trailing edge outlet channel 6.

In other words, the orientation of the turbulators 44 is controlled by the aspect ratio of the flow channels in which they are disposed for best cooperating with the corresponding perforate partitions 36 and the oblique crossover holes 40 for maximizing cooling effectiveness and efficiency.

As initially illustrated in FIG. 3, each of the turbulators 44 is inclined radially or longitudinally outwardly inside each sidewall 24,26 and includes an upstream or starting first end 46 that first receives the main coolant 20 as it flows through the flow channel from the inlet end thereof. And, each turbulator also includes a longitudinally opposite downstream or terminating second end 48 that last receives the main coolant 20 channeled through the corresponding flow channel.

Since the turbulators 44 are inclined longitudinally in the corresponding inlet channels 2,5, at 45 degrees for example, the starting and terminating ends 46,48 are located at different elevations in the radial or longitudinal span of the airfoil and behave differently in the differently configured inlet channels 2,5.

Figure 4:
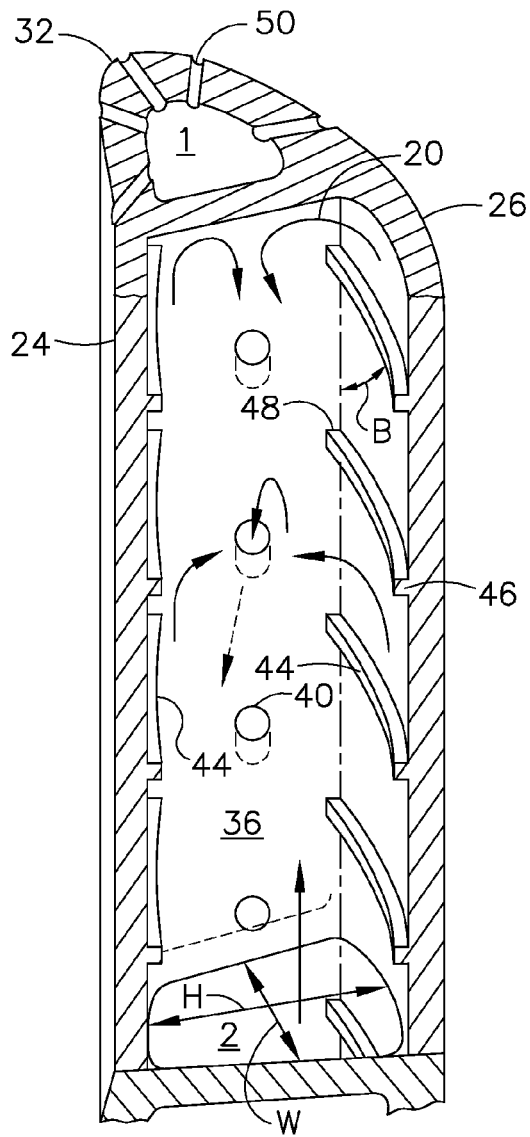
FIG. 4 is a partly sectional elevational view through a portion of the second flow channel illustrated in FIG. 2 and taken along line 4-4.

More specifically, for the forward inlet channel 2 and its less than unity aspect ratio as shown in FIGS. 3 and 4, the turbulators 44 are inclined longitudinally outwardly toward the leading edge and forward perforate partition 36, with the terminating ends 48 adjoining the perforate partition 36 at a higher elevation than the starting ends 46 adjoining the aft imperforate partition bounding the aft side of the inlet channel 2.

Figure 5:
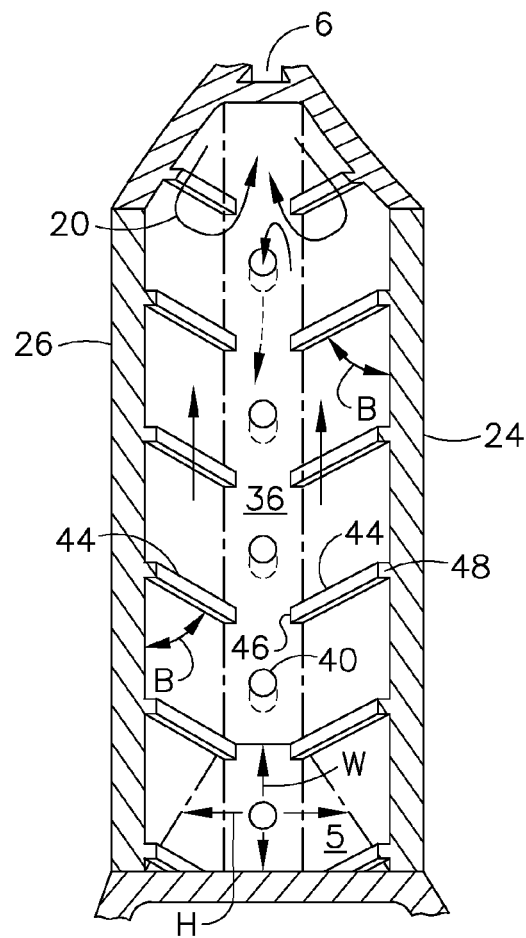
FIG. 5 is a partly sectional elevational view of the fifth flow channel illustrated in FIG. 2 and taken along line 5-5.

In contrast, the turbulators 44 in the aft inlet channel 5 shown in FIGS. 3 and 5 are inclined longitudinally inwardly toward the aft perforate partition 36, with the starting ends 46 of the turbulators adjoining the forward perforate partition 36 lower in elevation than the opposite terminating ends 48 which adjoin the forward imperforate partition 36 bounding the forward side of the inlet channel 5 which has the aspect ratio greater than unity.

As indicated above, the oblique crossover holes 40 may be preferentially used for locally reversing the direction of the main coolant flow in the corresponding inlet channels 2,5 into the corresponding outlet channels 1,6 for specifically introducing additional pressure drop or pressure losses in the crossover holes or orifices 40 which correspondingly reduces coolant flowrate through the cooling circuits.

In this way, the cast crossover holes 40 may be utilized in relatively small turbine airfoils with flow diameters larger than required while nevertheless reducing coolant flow therethrough. Excess cooling is therefore reduced while also increasing engine performance and efficiency.

Correspondingly, the preferential orientation of the turbulators 44 in the inlet channels 2,5 further improves performance and efficiency by providing locally cooler flow through the corresponding crossover holes 40 for the different configurations of the different aspect ratio forward and aft inlet channels 2,5.

More specifically, FIGS. 2 and 4 illustrate the small aspect ratio inlet channel 2 and the cooperation of the turbulators 44 and crossover holes 40 therein. The main coolant flow 20 is longitudinally upward in FIG. 4 and is tripped by the inclined turbulators 44 which introduce a secondary flow field in the transverse or radial plane.

Since the turbulators 44 are relatively short and located on the short side of the inlet channel 2, their heat transfer affect is locally pronounced near those short sidewalls, with the secondary flow therealong being relatively hotter than the cooler main or core flow near the center of the low aspect ratio inlet channel 2.

Accordingly, the best location for the crossover holes 40 to obtain the coolest local flow temperature is in the bulk or core flow at the terminating ends 48 of the turbulators. In this way, locally cool flow is channeled through the crossover holes 40 located along the center of the relatively wide perforate partition 36 illustrated in FIG. 4 for improving impingement cooling of the leading edge.

In contrast, the aft inlet channel 5 illustrated in FIGS. 2 and 5 is relatively narrow due to the high aspect ratio, with the turbulators 44 being relatively long and disposed along the relatively long sidewalls bounding the flow channel 5.

In this configuration, the long turbulators 44 in the high aspect ratio flow channel 5 have a greater heat transfer affect which heats the coolant greater than the short turbulators in the low aspect ratio second channel 2. Furthermore, the secondary flow in the fifth channel 5 is stronger than in the second flow channel 2 which correspondingly effects substantially different local temperatures in the coolant channeled through the differently configured flow channels 2,5.

FIG. 3 best illustrates the opposite orientation of the turbulators 44 in the second and fifth flow channels 2,5 for best cooperating with the oppositely oriented crossover holes 40 therein. In the fifth flow channel 5, the starting ends 46 of the turbulators 44 adjoin the aft perforate partition 36 to provide locally cool coolant to the aft crossover holes 40 therein.

As the main coolant flow is channeled upwardly in the fifth channel 5 illustrated in FIG. 3, the secondary flow effected by the inclined turbulators 44 locally increases coolant temperature toward the terminating ends 48 of the turbulators. In other words, the coolant flow is initially coolest near the starting ends of the turbulators and increases in temperature at the terminating ends of the turbulators.

Accordingly, by orienting the turbulators 44 with their starting ends adjoining the narrow perforate partition 36 in the fifth channel 5 illustrated in FIG. 5, locally cool flow is channeled through the aft crossover holes 40 for maximizing cooling performance in the trailing edge region of the airfoil.

As initially shown in FIGS. 1 and 2, air jets from the forward crossover holes 40 are received in the leading edge flow channel 1 for impingement cooling the back side of the leading edge, with the spent cooling air being discharged through several rows of film cooling holes 50 bridging the pressure and suction sidewalls around the leading edge.

Correspondingly, the trailing edge flow channel 6 receives the coolant jets from the aft crossover holes 40 for impingement cooling the internal front side of the trailing edge, with the spent coolant being discharged through a row of trailing edge coolant slots or holes 52 which typically breach the pressure side of the thin trailing edge region.

The film cooling holes 50 illustrated in FIG. 3 are preferably inclined through the sidewalls 24,26 around the leading edge in counter-inclination with the forward crossover holes 40 for additional benefit.

In particular, the forward crossover holes 40 are inclined longitudinally inwardly from the inlet channel 2 to the outlet channel 1 toward the leading edge 32, whereas the film cooling holes 50 are inclined oppositely and longitudinally outwardly from the outlet channel 1 and through the sidewall of the airfoil.

In this way, additional pressure drop is created not only in the crossover holes 40, but also in the oppositely inclined film cooling holes 50 for further reducing the flowrate of the coolant being discharged through the airfoil.

Since the outlet channel 1 is disposed directly behind the leading edge 32, it can feed multiple rows of film cooling holes 50 through both sidewalls 24,26 bridging the leading edge 32. All of the leading edge film cooling holes 50 are preferably inclined oppositely to the forward crossover holes 40 terminating in the first channel 1 for collectively reducing the flowrate of the discharged film cooling air.

Reducing coolant flowrate may be used to further increase engine efficiency. Alternatively, for a given flowrate, the number of film cooling holes may be increased for increasing surface coverage of the limited film cooling air.

Corresponding improvements may also be introduced into the row of trailing edge cooling slots 52 illustrated in FIG. 3. The exemplary trailing edge slot 52 diverge at their outlets in a conventional manner and are typically formed by casting, which casting thereof is typically limited to larger turbine airfoil sizes.

As indicated above, small turbine airfoils face the particular problem of castability of small features therein which nevertheless have a minimum castable size. In small turbine airfoils, the trailing edge holes are not castable as being too large, but instead are drilled after the airfoil is cast, with the drilled holes being substantially smaller in flow diameter than conventionally cast cooling slots.

Accordingly, by the introduction of the oblique crossover holes 40 feeding the aft channel 6, the additional pressure losses therefrom reduce the discharge flowrate of the coolant which allows the introduction of the relatively large cast trailing edge slots 52 in a small airfoil design, which would otherwise not be practical or possible.

The use of the larger cast trailing edge slots 52 in the otherwise small turbine airfoil improves trailing edge slot coverage and attendant cooling performance, but with reduced flowrate due to the pressure losses created by the oblique crossover holes 40.

The forward and aft crossover holes 40 illustrated in FIGS. 2 and 3 are representative of two types of internal crossover holes 40 specifically used for impingement cooling of the leading and trailing edges, and may be used individually or together as desired depending upon the specific airfoil design.

The oblique crossover holes 40 introduce additional pressure losses when inclined oppositely to the direction of the coolant flow and may be preferentially used for decreasing flowrate therethrough.

The crossover holes 40 may have different oblique orientations relative to the predominant flow through the corresponding inlet and outlet channels for other advantages as desired for specific applications.

Although turbulators are conventional features and found in various configurations and angular orientations, they may be preferentially used as described above for cooperating with the crossover holes 40 and improving heat transfer effectiveness in better cooling turbine airfoils while minimizing chargeable flow therefor. Various embodiments of the turbulators may be used as desired while cooperating in the manner described above which is dependent upon the aspect ratio of the individual flow channel and its location between the leading and trailing edges of the airfoil.

The oblique crossover holes described above may be used for particular advantage in small turbine airfoils, but may have corresponding advantages in larger airfoils where desired to locally tailor heat transfer performance.

And, the crossover holes and cooperating turbulators are shown in the exemplary turbine rotor blade subject to centrifugal forces during operation which also effects cooling performance, but could also be used in stator vanes where desired for improving cooling performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine airfoil comprising:
pressure and suction sidewalls extending longitudinally in span and axially in chord between opposite leading and trailing edges and spaced transversely apart therebetween to define a plurality of flow channels extending longitudinally and separated chordally by partitions bridging said sidewalls;
one of said partitions is perforate with a longitudinal row of crossover holes, each of the crossover holes extending obliquely therethrough and between one of said channels that is coupled with an inlet adapted to be connected to a source of pressurized coolant and designated as an inlet channel on one side of said perforate partition and one of said channels designated as an outlet channel on an opposite side thereof;
said crossover holes are inclined longitudinally through said perforate partition counter to said longitudinal inlet channels for reversing direction of coolant channeled therethrough, wherein said crossover holes extend axially through said perforate partition along a camber line bisecting said airfoil between said leading and trailing edges; and
banks of turbulators lining said pressure and suction sidewalls inside said inlet channel for introducing secondary flow in said coolant, and inclined longitudinally relative to said crossover holes for channeling locally cool coolant thereto.

2. An airfoil according to claim 1 wherein:
said inlet channel has an aspect ratio of chordal width over transverse height;
said turbulators have a first inclination direction terminating at said perforate partition for aspect ratios less than unity; and
said turbulators have an opposite second inclination direction starting at said perforate partition for said aspect ratio greater than unity.

3. An airfoil according to claim 2 wherein:
each of said turbulators has a starting first end that first receives said coolant through said inlet channel, and a longitudinally opposite terminating second end that last receives said coolant through said inlet channel; and said turbulators are inclined longitudinally in said inlet channels with said starting and terminating ends being at different elevation in span.

4. An airfoil according to claim 3 wherein:

said pressure and suction sidewalls extend longitudinally in span from a radially inner root to a radially outer tip; and said crossover holes are inclined longitudinally inwardly from said inlet channel to said outlet channel.

5. An airfoil according to claim 3 wherein said outlet channel is disposed directly behind said leading edge, and said crossover holes are inclined toward said leading edge for impingement cooling the back side thereof.

6. An airfoil according to claim 5 wherein said turbulators are inclined longitudinally in said inlet channel with said terminating ends adjoining said perforate partition.

7. An airfoil according to claim 6 further comprising a row of film cooling holes inclined through one of said sidewalls in counter-inclination with said crossover holes.

8. An airfoil according to claim 7 wherein said crossover holes are inclined longitudinally inwardly from said inlet channel to said outlet channel, and said film cooling holes are inclined longitudinal outwardly from said outlet channel and through said one sidewalls.

9. An airfoil according to claim 3 wherein said outlet channel is disposed directly in front of said trailing edge, and said crossover holes are inclined toward said trailing edge for impingement cooling the front side thereof.

10. An airfoil according to claim 9 wherein said turbulators are inclined longitudinally in said inlet channel with said starting ends adjoining said perforate partition.

11. A turbine airfoil comprising:

pressure and suction sidewalls extending longitudinally in span and axially in chord between opposite leading and trailing edges and spaced transversely apart therebetween to define a plurality of flow channels extending longitudinally and separated chordally by partitions bridging said sidewalls; and one of said partitions is perforate with a longitudinal row of crossover holes extending obliquely therethrough, said flow channels including an inlet channel on one side of said perforate partition and an outlet channel on an opposite side thereof, wherein said inlet channel includes an inlet at one end for channeling coolant longitudinally therethrough, wherein said crossover holes extend axially through said perforate partition along a camber line bisecting said airfoil between said leading and trailing edges, and wherein said crossover holes are inclined longitudinally through said perforate partition counter to said inlet channel for reversing direction of said coolant therethrough.

12. An airfoil according to claim 11 wherein:

said pressure and suction sidewalls extend longitudinally in span from a radially inner root to a radially outer tip; and said crossover holes are inclined longitudinally inwardly from said inlet channel to said outlet channel.

13. An airfoil according to claim 11 wherein said outlet channel is disposed directly behind said leading edge, and said crossover holes are inclined toward said leading edge for impingement cooling the back side thereof.

14. An airfoil according to claim 11 wherein said outlet channel is disposed directly in front of said trailing edge, and said crossover holes are inclined toward said trailing edge for impingement cooling the front side thereof.

15. An airfoil according to claim 11 further comprising banks of turbulators lining said pressure and suction sidewalls inside said inlet channel for introducing secondary flow in said coolant, and inclined longitudinally relative to said crossover holes for channeling locally cool coolant thereto.

16. An airfoil according to claim 15 wherein:

said inlet channel has an aspect ratio of chordal width over transverse height;

said turbulators have a first inclination direction terminating at said perforate partition for aspect ratios less than unity; and said turbulators have an opposite second inclination direction starting at said perforate partition for said aspect ratio greater than unity.

17. An airfoil according to claim 16 wherein:

each of said turbulators has a starting first end that first receives said coolant through said inlet channel, and a longitudinally opposite terminating second end that last receives said coolant through said inlet channel; and said turbulators are inclined longitudinally in said inlet channels with said starting and terminating ends being at different elevation in span.

18. An airfoil according to claim 15 wherein:

said outlet channel is disposed directly behind said leading edge, and said crossover holes are inclined toward said leading edge for impingement cooling the back side thereof;

each of said turbulators has a starting first end that first receives said coolant through said inlet channel, and a longitudinally opposite terminating second end that last receives said coolant through said inlet channel; and said turbulators are inclined longitudinally in said inlet channel with said terminating ends adjoining said perforate partition.

19. An airfoil according to claim 15 wherein:

said outlet channel is disposed directly in front of said trailing edge, and said crossover holes are inclined toward said trailing edge for impingement cooling the front side thereof;

each of said turbulators has a starting first end that first receives said coolant through said inlet channel, and a longitudinally opposite terminating second end that last receives said coolant through said inlet channel; and said turbulators are inclined longitudinally in said inlet channel with said starting ends adjoining said perforate partition.

20. An airfoil according to claim 11 further comprising a row of film cooling holes inclined through one of said sidewalls in counter-inclination with said crossover holes.

21. An airfoil according to claim 20 wherein said crossover holes are inclined longitudinally inwardly from said inlet channel to said outlet channel, and said film cooling holes are inclined longitudinal outwardly from said outlet channel and through said one sidewall.

22. An airfoil according to claim 21 wherein said outlet channel is disposed directly behind said leading edge, and said film cooling holes are arranged in multiple rows through both said pressure and suction sidewalls and inclined oppositely to said crossover holes.

* * * * *